(12) United States Patent
Krueger et al.

(10) Patent No.: US 7,480,678 B2
(45) Date of Patent: Jan. 20, 2009

(54) CREATING REFERENCE OBJECTS

(75) Inventors: James C. Krueger, Byron, MN (US); Randall Richard Schnier, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 10/977,769

(22) Filed: Oct. 29, 2004

(65) Prior Publication Data

US 2006/0095467 A1  May 4, 2006

(51) Int. Cl.
*G06F 17/30* (2006.01)

(52) U.S. Cl. .............................. 707/103 R; 707/103 X; 707/103 Y; 707/103 Z

(58) Field of Classification Search ........................ None
See application file for complete search history.

(56) References Cited

U.S. PATENT DOCUMENTS

| | | | | |
|---|---|---|---|---|
| 5,802,291 A * | 9/1998 | Balick et al. | ................. | 709/202 |
| 5,857,102 A * | 1/1999 | McChesney et al. | ........ | 713/100 |
| 6,560,609 B1 * | 5/2003 | Frey et al. | ................ | 707/103 R |
| 6,567,818 B1 * | 5/2003 | Frey et al. | ................ | 707/103 R |
| 6,594,671 B1 * | 7/2003 | Aman et al. | ............ | 707/103 R |
| 6,640,249 B1 * | 10/2003 | Bowman-Amuah | ......... | 709/228 |
| 6,687,831 B1 * | 2/2004 | Albaugh et al. | ................. | 726/7 |
| 6,792,608 B1 * | 9/2004 | Theeten | ....................... | 719/316 |
| 2002/0016866 A1 * | 2/2002 | Menges et al. | .............. | 709/315 |
| 2002/0145924 A1 * | 10/2002 | Beckwith | ..................... | 365/200 |
| 2003/0236925 A1 * | 12/2003 | Balek et al. | ................. | 709/328 |
| 2004/0237092 A1 * | 11/2004 | Jairath | ........................ | 719/315 |

\* cited by examiner

*Primary Examiner*—Christian P Chace
*Assistant Examiner*—Bai D Vu
(74) *Attorney, Agent, or Firm*—Owen J. Gamon

(57) ABSTRACT

A method, apparatus, system, and signal-bearing medium that, in an embodiment, in response to a request to create a target object, create a reference object for the target object and bind the reference object to a name space without the target object being instantiated. In response to an invocation of a method on the reference object, a determination is made whether a target object associated with the reference object exists. If the target object does not already exist, the target object is instantiated. If the target object does already exist, the target object is returned. In this way, target objects are not instantiated until a method on the reference object is invoked, which in an embodiment increases the performance of the invoking application.

1 Claim, 4 Drawing Sheets

CREATING REFERENCE OBJECTS

FIELD

An embodiment of the invention generally relates to computers. In particular, an embodiment of the invention generally relates to creating reference objects in a name space.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

Years ago, computers were isolated devices that did not communicate with each other. But, today computers are often connected in networks, such as the Internet or World Wide Web, and a user at one computer, often called a client, may wish to access information at multiple other computers, often called servers, via a network. Accessing and using information from multiple computers is often called distributed computing. Since these multiple computers may be using different software that runs on different hardware, distributing computing is a challenging and complex environment.

One way to address the difficult problems of distributed computing is to use the Enterprise JavaBeans (EJB) specification, which provides for creating server-side scalable, transactional, multi-user, secure enterprise-level applications. The Enterprise JavaBeans specification provides a consistent component architecture framework for creating distributed applications.

According to the EJB specification, Enterprise Beans are building blocks that either can be used alone or with other enterprise beans to build complete, robust, thin-client multi-tiered applications. An EJB is a body of code with fields and methods to implement modules of business logic. An EJB can either be transient or persistent.

When an EJB application needs to use the services of an enterprise Bean, it creates the EJB through its Home interface. The application specifically uses one of the multiple create( ) methods that the Home interface defines. The implementation of the Home interface is done through an object called the Home object. An instance of this Home object is created within the server and is made available to the application as a factory for creating the enterprise Bean.

When an EJB application is started, a reference object for the EJB Home object corresponding to each type of EJB within the application must be placed (bound) into a data structure called a name space, which makes it available for lookup operations from users of that type of EJB. A reference object is a type of pointer object that is used to gain access to an associated target object, which in this example is the Home object. Referencing the Home object requires that the actual target object of that type be loaded and instantiated in the application server and then registered with the Object Request Broker (ORB), which in turn creates the reference object.

Since a large EJB application may include hundreds of EJB types, only a portion of which might actually be used during the execution of the application, loading and instantiating each one of the hundreds of the EJB types at application startup can cause performance degradation of the EJB application.

Without a better way to handle references to objects, users will continue to suffer from degraded performance. Although the aforementioned problems have been described in the context of Enterprise JavaBeans and Home objects, they may occur in the CORBA (Common Object Request Broker Architecture) environment or any other appropriate context, and they may occur for any appropriate type of target object.

SUMMARY

A method, apparatus, system, and signal-bearing medium are provided that, in an embodiment, in response to a request to create a target object, create a reference object for the target object and bind the reference object to a name space without the target object being instantiated. In response to an invocation of a method on the reference object, a determination is made whether a target object associated with the reference object exists. If the target object does not already exist, the target object is instantiated. If the target object does already exist, the target object is returned. In this way, target objects are not instantiated until a method on the reference object is invoked, which in an embodiment increases the performance of the invoking application.

DETAILED DESCRIPTION

Figure 1:
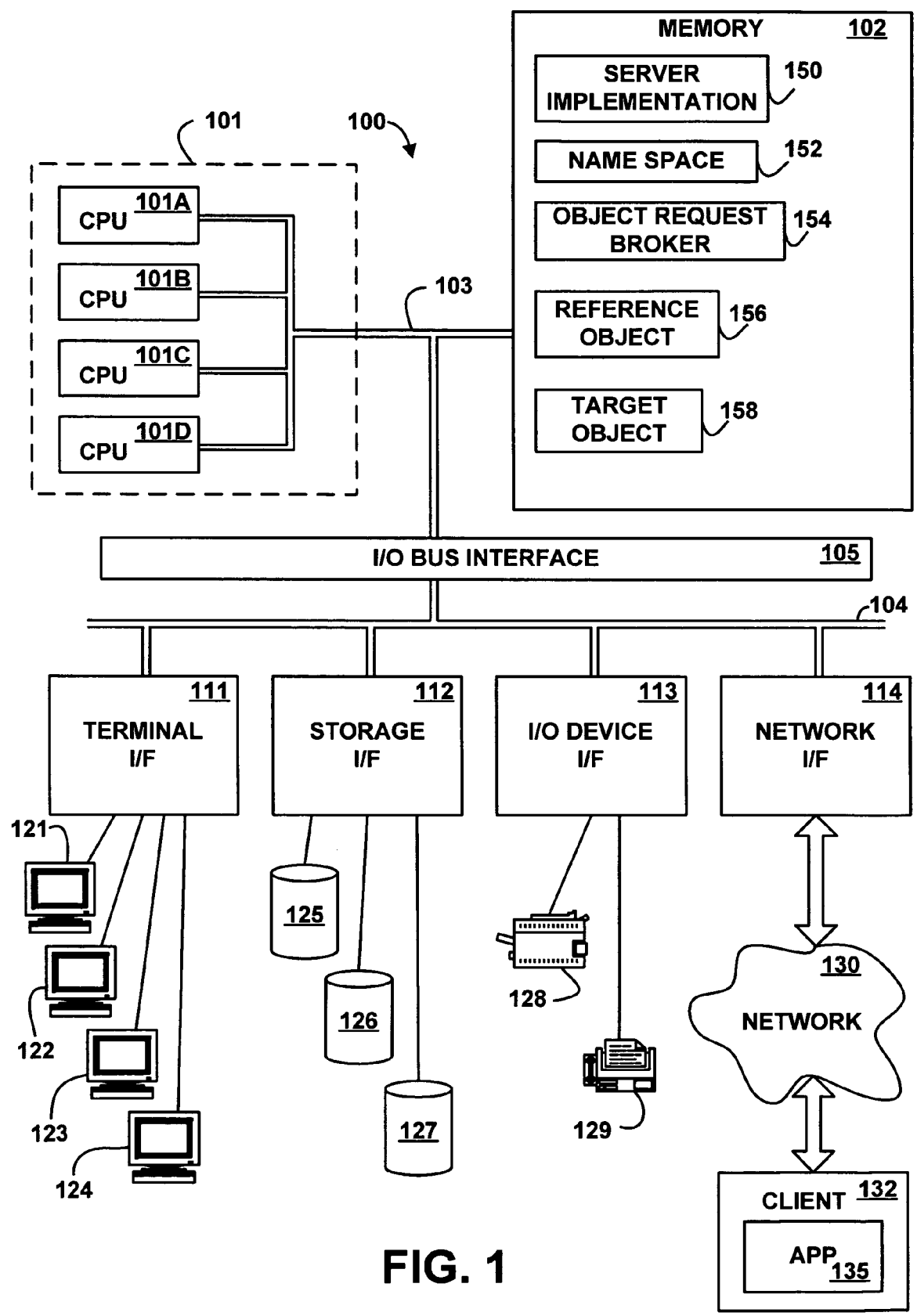
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100, operating as a server, connected to a client 132 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes a server implementation 150, a name space 152, an object request broker 154, a reference object 156, and a target object 158. Although the server implementation 150, the name space 152, the object request broker 154, the reference object 156, and the target object 158 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the server implementation 150, the name space 152, the object request broker 154, the reference object 156, and the target object 158 are illustrated as being contained within the main memory 102, these elements are not necessarily all completely contained in the same storage device at the same time. Further, although the server implementation 150, the name space 152, the object request broker 154, the reference object 156, and the target object 158 are illustrated as being separate entities, in other embodiments some of them, or portions of some of them, may be packaged together.

The server implementation 150 uses the name of the target object 158 and information regarding the target object 158 to create the reference object 156 and binds the reference object 156 to the name space 152. An object is a discrete entity that provides the operations defined in its interface and includes a method or methods and encapsulated data. An object is instantiated from a class definition. The name space 152 includes the names of the target objects 158 and pointers to the respective reference objects 156 that are associated with the named target objects 158. The name space 152 is further described below with reference to FIG. 2. Applications use the reference objects 156 to invoke methods against the respective target objects 158 via the object request broker 154 and the name space 152. In an embodiment, the target object 158 is an EJB Home object, but in other embodiments any appropriate target object may be used.

In an embodiment, the server implementation 150 is an EJB container, but in other embodiments any appropriate implementation may be used. In an embodiment, the server implementation 150 includes instructions capable of executing on the processor 101 or statements capable of being interpreted by instructions executing on the processor 101 to perform the functions as further described below with reference to FIGS. 3 and 4. In another embodiment, the server implementation 150 may be implemented in microcode. In another embodiment, the server implementation 150 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3× specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The client 132 includes an application 135, which sends requests to the server implementation 150. The client 132 may also include any or all of the hardware and/or software elements previously described above for the computer system 100. Although only one client 132 and one application 135 are illustrated in FIG. 1, in other embodiments any number of clients 132 and any number of applications 135 may be present. In another embodiment, the application 135 is present at the server 100, and the client 132 is not present, optional, or not used.

It should be understood that FIG. 1 is intended to depict the representative major components of the computer system 100, the network 130, and the client 132 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
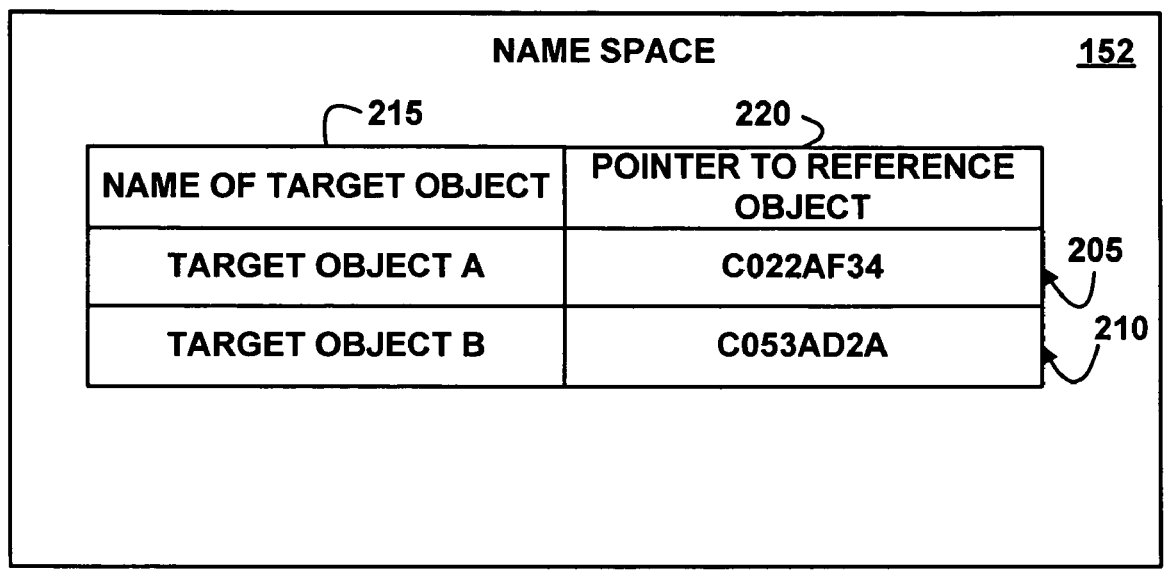
FIG. 2 depicts a block diagram of an example data structure for a name space, according to an embodiment of the invention.

FIG. 2 depicts a block diagram of an example data structure for the name space 152, according to an embodiment of the invention. The name space 152 includes records 205 and 210, but in other embodiments any number of records with any appropriate data may be present. Each of the records 205 and 210 includes a name of a target object field 215 and a pointer to a reference object field 220. The name of the target object field 215 includes the name of the target object 158, and the pointer to reference object field 220 includes a pointer to the associated reference object 156, which is an address in the main memory 102, or in another embodiment the pointer to the associated reference object field 220 contains a virtual memory address. For example, in the record 205, the name of the target object field 215 includes "target object a," and the pointer to the associated reference object field 220 contains "C022AF34." As a further example, in the record 210, the name of the target object field 215 includes "target object b," and the pointer to the associated reference object 220 field contains "C053AD2A." The records 205 and 210 in the name space 152 are used by the server implementation 150 and the application 135, as further described below with reference to FIGS. 3 and 4.

Figure 3:
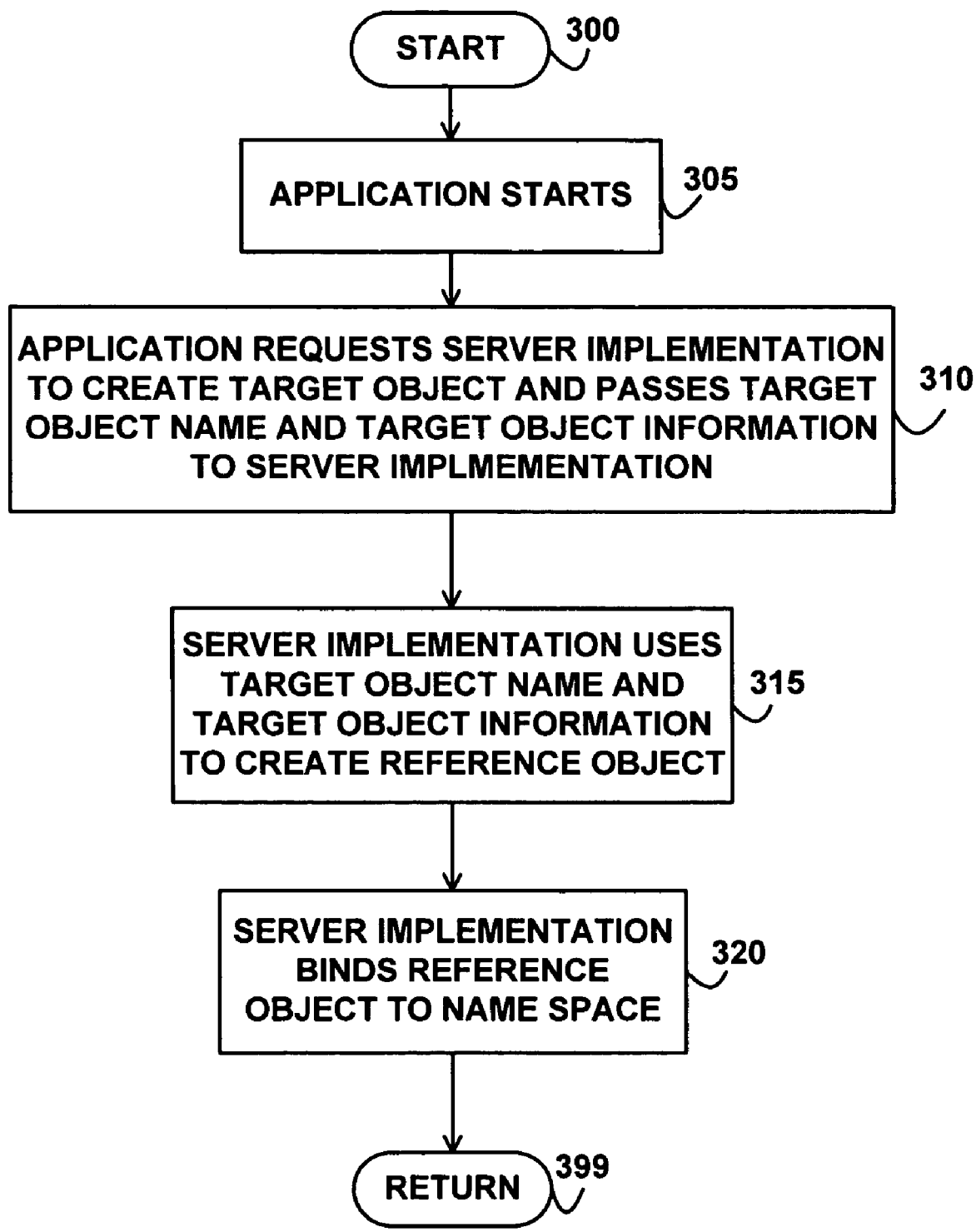
FIG. 3 depicts a flowchart of example processing for creating a reference object and binding the reference object to the name space, according to an embodiment of the invention.

FIG. 3 depicts a flowchart of example processing for creating the reference object 156 and binding the reference object 156 to the name space 152 without instantiating the target object 158, according to an embodiment of the invention.

Control begins at block 300. Control then continues to block 305 where the application 135 starts. Control then continues to block 310, where as part of a startup routine, the application 135 requests the server implementation 150 to create the target object 158 and passes the name of the target object 158 and target object information to the server implementation 150. In an embodiment, the target object information may include a name or other identifier of the client 132, an address (e.g. an IP address, a TCP/IP address, or any other appropriate address) that the application 135 uses to access the network 130, a port number that the application 135 uses to access the network 130, and/or any other appropriate information related to the target object 158, the client 132, and/or the application 135.

Control then continues to block 315 where the server implementation 150 uses the target object name and the target object information to create the reference object 156. Control then continues to block 320 where the server implementation 150 binds the newly-created reference object 156 to the name space 152 by creating a new record in the name space 152 (such as the record 205 or 210), saving the name of the target object 158 that was passed from application 135 in the name of the target object field 215, and saving the pointer to the newly-created reference object 156 in the pointer to the reference object field 220. The reference object 156 is now associated with the application 135. Control then continues to block 399 where the logic of FIG. 3 returns.

Figure 4:
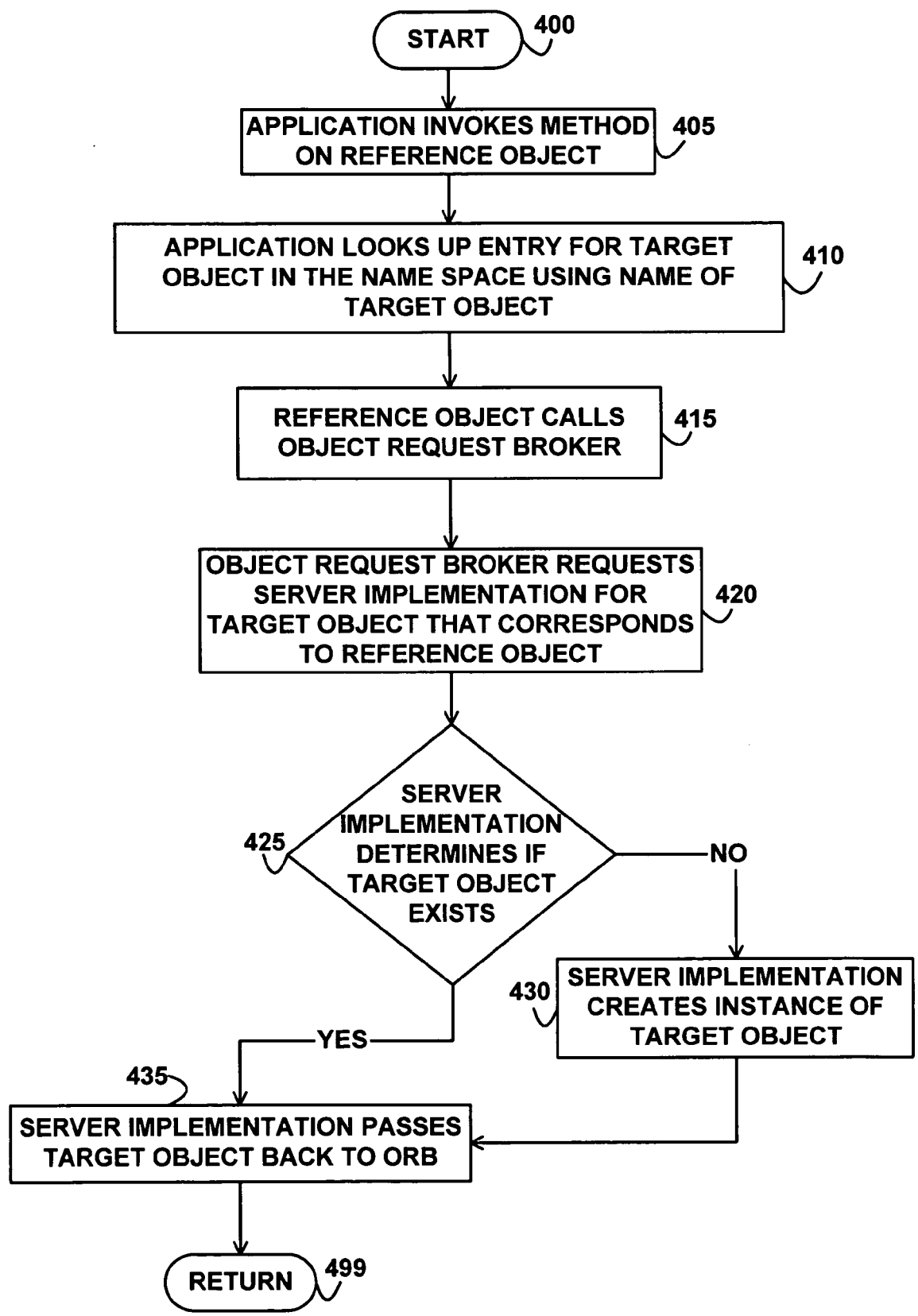
FIG. 4 depicts a flowchart of example processing for accessing the reference object via a method, according to an embodiment of the invention.

FIG. 4 depicts a flowchart of example processing for accessing the reference object 156 by a method in the application 135, according to an embodiment of the invention. Control begins at block 400. Control then continues to block 405 where the application 135 invokes a method on the reference object 156. Control then continues to block 410 where the application 135 looks for a record (e.g., the record 205 or 210) associated with the target object 158 in the name space 152 using the name of the target object 158 as an index into the name space 152 via the name of the target object field 215. Control then continues to block 415 where, in response to the method being invoked against the reference object 156, the reference object 156 calls the object request broker 154.

Control then continues to block 420 where the request broker 154 requests the server implementation 150 for the target object 158 that corresponds to the reference object 156. Control then continues to block 425 where the server implementation 150 determines whether a target object 158 exists that is associated with the reference object 156. If the determination at block 425 is false, then an associated target object 158 does not exist, so control continues to block 430 where the server implementation 150 creates an instance of the target object 158 (instantiates the target object 158) that is associated with the reference object 156. Control then continues to block 435 where the server implementation 150 passes the newly-instantiated target object 158 back to the object request broker 154, which passes the newly-instantiated target object 158 back to the invoking method in the application 135. Control then continues to block 499 where the logic of FIG. 4 returns.

If the determination at block 425 is true, then the associated target object 158 does already exist, so control continues to block 435 where the server implementation 150 passes the pre-existing target object 158 back to the object request broker 154, which passes the target object 158 back to the invoking method in the application 135. Control then continues to block 499 where the logic of FIG. 4 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:

receiving, at a server, a request comprising a target object name and a target object information to create a target object from a client, wherein the target object information comprises an identifier of an IP address of the client;

in response to the request from the client to create the target object, creating a reference object from a class definition at the server using the target object name and the target object information, wherein the target object and the reference object are separate;

in response to the creating the reference object, binding the reference object to a name space at the server is performed while the target object associated with the reference object is not instantiated, wherein the binding the reference object to the name space further comprising creating a record and saving the name of the target object and a pointer into the record in the name space, wherein the pointer is associated with the name of the target object, and wherein the pointer points to the reference object;

in response to an invocation of a method at the client on the reference object, determining whether the target object associated with the reference object exists at the server, wherein the client searches for the record associated with the target object in the name space using the name of the target object as an index into the name space and the pointer to the reference object;

if the target object does not exist, creating an instance of the target object and returning the instance of the target object to the method that was invoked on the reference object in response to the determining, wherein the target object comprises a home object;

if the target object does exist, returning the target object to the method that was invoked on the reference object in response to the determining; and returning the target object to an object request broker.

* * * * *